(12) United States Patent
Namiki

(10) Patent No.: US 11,738,656 B2
(45) Date of Patent: Aug. 29, 2023

(54) INFORMATION PROVIDING DEVICE, INFORMATION PROVIDING METHOD, AND STORAGE MEDIUM

(71) Applicant: HONDA MOTOR CO., LTD., Tokyo (JP)

(72) Inventor: Shigeru Namiki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 261 days.

(21) Appl. No.: 17/182,263

(22) Filed: Feb. 23, 2021

(65) Prior Publication Data

US 2021/0276443 A1 Sep. 9, 2021

(30) Foreign Application Priority Data

Mar. 9, 2020 (JP) .................................. 2020-040317

(51) Int. Cl.
*B60L 53/62* (2019.01)
*G06Q 30/0601* (2023.01)
*B60L 58/10* (2019.01)

(52) U.S. Cl.
CPC ............... *B60L 53/62* (2019.02); *B60L 58/10* (2019.02); *G06Q 30/0631* (2013.01)

(58) Field of Classification Search
CPC .......... B60L 53/62; B60L 58/10; B60L 58/16; B60L 2250/16; G06Q 30/0631; Y02T 10/70; Y02T 10/7072; Y02T 90/12; G06T 13/80; A63F 13/42; A63F 13/46; A63F 13/58; A63F 13/814; A63F 13/833; A63F 2300/6081; A63F 2300/61; H04W 4/40
USPC ....................................................... 340/455
See application file for complete search history.

(56) References Cited

U.S. PATENT DOCUMENTS

2012/0048177 A1* 3/2012 Tomono ................. G01D 11/28
 116/288
2019/0047380 A1* 2/2019 Snider .................... G08B 21/22

FOREIGN PATENT DOCUMENTS

| JP | 2000-307689 | | 11/2000 |
| JP | 20000307689 A | * | 11/2000 |
| JP | 2004-227542 | | 8/2004 |
| JP | 2005-030369 | | 2/2005 |

(Continued)

OTHER PUBLICATIONS

Japanese Office Action for Japanese Patent Application No. 2020-040317 dated Dec. 21, 2021.

*Primary Examiner* — Omar Casillashernandez
(74) *Attorney, Agent, or Firm* — Amin, Turocy & Watson, LLP

(57) ABSTRACT

An information providing device according to an aspect includes a setter that sets points for a user of a vehicle on the basis of one or both of information on a battery storing an electric power for traveling of the vehicle and information on driving of the vehicle, an information provider that provides information on the point set by the setter to the user of the vehicle, an acquirer that acquires distribution information in which at least some of the points are distributed as a point for causing an anthropomorphic character associated with the battery to perform a predetermined operation, and a match manager that generates information on a match between the anthropomorphic character and another anthropomorphic character on the basis of the distribution information acquired by the acquirer and provide the generated information to the user.

10 Claims, 13 Drawing Sheets

(56) References Cited

FOREIGN PATENT DOCUMENTS

| JP | 2007-180951 | | | 7/2007 |
|----|-------------|---|---|--------|
| JP | 20070180951 A | * | | 7/2007 |
| WO | 2018/146756 | | | 8/2018 |

* cited by examiner

| BATTERY ID | PRODUCT NAME | START DATE OF USE | NUMBER OF TIMES OF CHARGE | SOC [%] | CHARACTER ID |
|---|---|---|---|---|---|
| BAT001 | V001-XXX | 2017/12/05 | 120 | 80 | CH001 |
| BAT102 | V005-XXX | 2019/07/01 | 8 | 65 | CH002 |
| BAT209 | V222-XXX | 2018/09/09 | 33 | 70 | CH204 |
| ... | ... | ... | ... | ... | ... |

| CHARACTER ID | CHARACTER IMAGE INFORMATION | CHARACTER VOICE INFORMATION | DETAILED INFORMATION |
|---|---|---|---|
| CH001 | IM001 | SO001 | GROWTH LEVEL: ***<br>CHARACTERISTICS: ***<br>ITEM ID: ***<br>SKILL ID: ***<br>... |
| CH002 | IM002 | SO002 | GGROWTH LEVEL: ***<br>CHARACTERISTICS: ***<br>ITEM ID: ***<br>SKILL ID: ***<br>... |
| CH204 | IM204 | SO204 | GROWTH LEVEL: ***<br>CHARACTERISTICS: ***<br>ITEM ID: ***<br>SKILL ID: ***<br>... |
| ... | ... | ... | ... |

| TRAVELING HISTORY | PURCHASE HISTORY | CHARGE AND DISCHARGE HISTORY | DRIVING HISTORY | ... |
|---|---|---|---|---|
| *** | *** | *** | *** | ... |

| USER ID | VEHICLE ID | TERMINAL DEVICE ID | HISTORY INFORMATION ||||| BATTERY SOC | CHARACTER INFORMATION | POINT THAT CAN BE USED AT TIME OF MATCH | BENEFIT INFORMATION |
|---|---|---|---|---|---|---|---|---|---|---|---|
| | | | TRAVELING HISTORY | PURCHASE HISTORY | CHARGE AND DISCHARGE HISTORY | DRIVING HISTORY | ... | | | | |
| U001 | V001 | T001 | *** | *** | *** | ... | ... | *** | *** | *** | *** |
| U002 | V002 | T002 | *** | *** | *** | ... | ... | *** | *** | *** | *** |
| ... | ... | ... | ... | ... | ... | ... | ... | ... | ... | ... | ... |

| CHARACTER ID | SKILL ID | SKILL NAME | CONSUMPTION POINT | USABLE LEVEL |
|---|---|---|---|---|
| CH 101 | SK 101 | * * * | 10 | 1 |
| | SK 102 | * * * | 30 | 5 |
| | SK 103 | * * * | 50 | 10 |
| CH201 | SK 201 | * * * | 10 | 1 |
| | CH 202 | * * * | 20 | 2 |
| | CH 203 | * * * | 40 | 10 |
| | CH 204 | * * * | 80 | 15 |
| ... | ... | ... | ... | ... |

INFORMATION PROVIDING DEVICE, INFORMATION PROVIDING METHOD, AND STORAGE MEDIUM

CROSS-REFERENCE TO RELATED APPLICATION

Priority is claimed on Japanese Patent Application No. 2020-040317, filed Mar. 9, 2020, the content of which is incorporated herein by reference.

BACKGROUND

Field of the Invention

The present invention relates to an information providing device, an information providing method, and a storage medium.

Description of Related Art

In the related art, technologies for displaying a remaining level or a state of deterioration of a battery are known (for example, Japanese Unexamined Patent Application, First Publication Nos. 2000-307689 and 2007-180951).

SUMMARY

However, in the related art, provision of information for facilitating the use and recovery of batteries mounted in vehicles has not been considered.

An aspect of the present invention has been made in consideration of such circumstances, and an object of the present invention is to provide an information providing device, an information providing method, and a storage medium capable of providing information for promoting use or recovery of a battery mounted in a vehicle.

The information providing device, the information providing method, and the storage medium according to the aspect of the present invention have the following configurations.

(1) An information providing device according to an aspect of the present invention is an information providing device including: a setter configured to set points for a user of a vehicle on the basis of one or both of information on a battery storing an electric power for traveling of the vehicle and information on driving of the vehicle; an information provider configured to provide information on the point set by the setter to the user of the vehicle; an acquirer configured to acquire distribution information in which at least some of the points are distributed as a point for causing an anthropomorphic character associated with the battery to perform a predetermined operation; and a match manager configured to generate information on a match between the anthropomorphic character and another anthropomorphic character on the basis of the distribution information acquired by the acquirer and provide the generated information to the user.

(2) In the information providing device according to (1), the setter sets points that can be used by the user of the vehicle at the time of the match on the basis of one or both of a charge rate of the battery included in the information on the battery and an amount of regenerative energy or an amount of generated energy of the vehicle at a predetermined time included in the information on the driving of the vehicle.

(3) In the information providing device according to (1), the match manager determines the other anthropomorphic character on the basis of at least one of a charge rate of the battery, a growth level of the anthropomorphic character, and a point for causing the anthropomorphic character to perform a predetermined operation.

(4) In the information providing device according to (1), the information provider provides the user with information for increasing the point set by the setter.

(5) In the information providing device according to (1), the setter increases the point depending on goods or services regarding the vehicle purchased by the user of the vehicle.

(6) In the information providing device according to (1), the match manager determines victory or defeat on the basis of an order of predetermined operations set for the anthropomorphic character and the other anthropomorphic character and an amount of point for the predetermined operation.

(7) In the information providing device according to (1), the match manager imparts a benefit to the user who wins the match.

(8) In the information providing device according to (7), the benefit imparted to the user who wins the match includes a benefit acquired from a user who loses the match.

(9) An information providing method according to an aspect of the present invention is an information providing method including: setting, by a computer, a point for a user of a vehicle on the basis of one or both of information on a battery storing an electric power for traveling of the vehicle and information on driving of the vehicle; providing, by the computer, information on the set point to the user of the vehicle; acquiring, by the computer, distribution information in which at least some of the points are distributed as a point for causing an anthropomorphic character associated with the battery to perform a predetermined operation; generating, by the computer, information on a match between the anthropomorphic character and another anthropomorphic character on the basis of the acquired distribution information; and providing, by the computer, the generated information to the user.

(10) A storage medium according to an aspect of the present invention is a computer-readable non-temporary storage medium storing a program, the program causing a computer to: set points for a user of a vehicle on the basis of one or both of information on a battery storing an electric power for traveling of the vehicle and information on driving of the vehicle; provide information on the set point to the user of the vehicle; acquire distribution information in which at least some of the points are distributed as a point for causing an anthropomorphic character associated with the battery to perform a predetermined operation; generate information on a match between the anthropomorphic character and another anthropomorphic character on the basis of the acquired distribution information; and provide the generated information to the user.

According to the above aspects (1) to (10), it is possible to provide information for promoting use or recovery of a battery mounted in a vehicle.

BRIEF DESCRIPTION OF THE DRAWINGS

FIG. 3 is a diagram illustrating an example of content of battery information.

FIG. 4 is a diagram illustrating an example of content of character information.

FIG. 5 is a diagram illustrating an example of content of history information.

FIG. 8 is a diagram illustrating an example of content of a user DB.

FIG. 9 is a diagram illustrating an example of content of a skill point DB.

DESCRIPTION OF EMBODIMENTS

Hereinafter, embodiments of the information providing device, the information providing method, and the storage medium of the present invention will be described with reference to the drawings.

[Overall Configuration]

Figure 1:
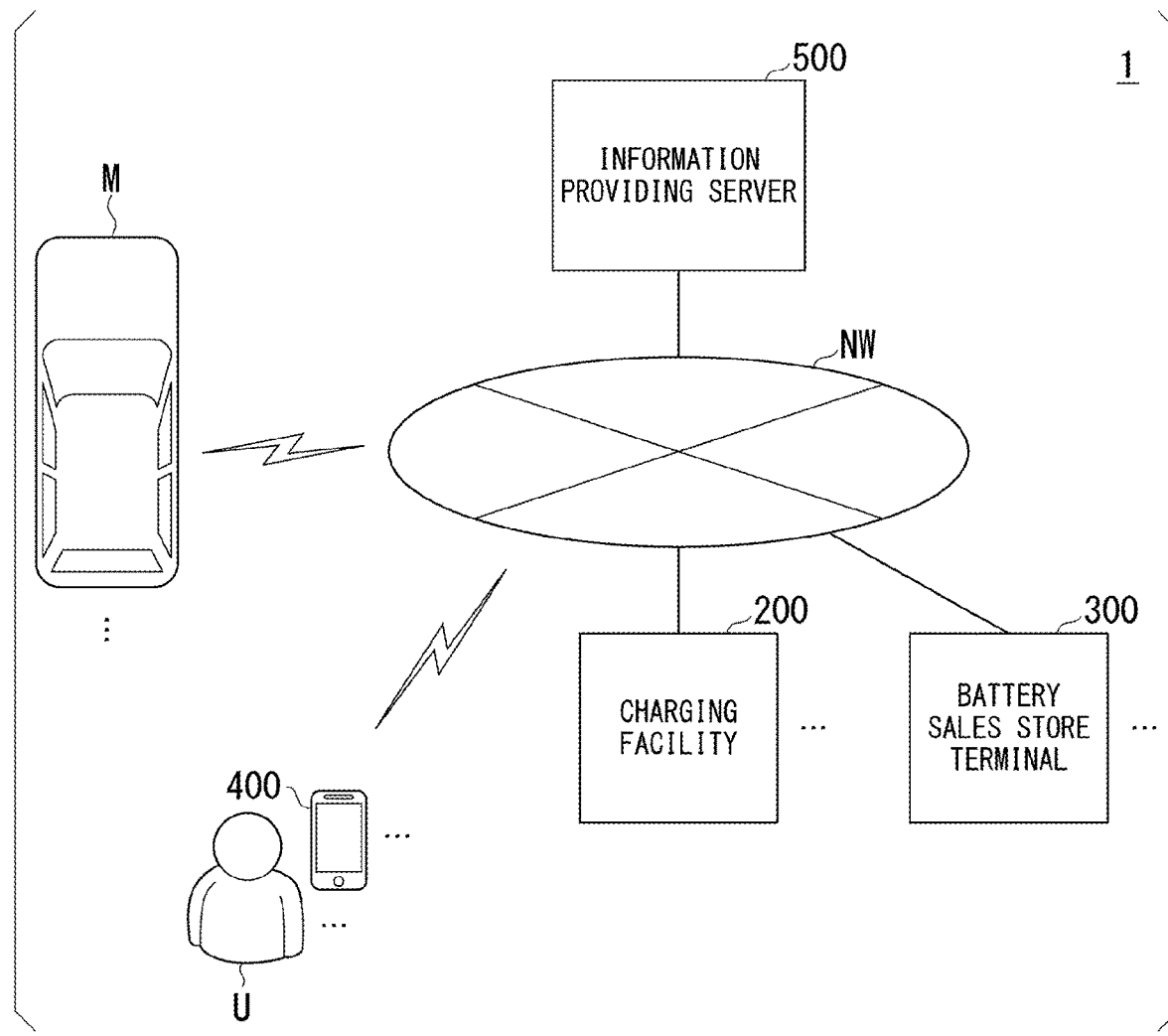
FIG. 1 is a configuration diagram of an information providing system including an information providing device of an embodiment.

FIG. 1 is a configuration diagram of an information providing system 1 including the information providing device of the embodiment. The information providing system 1 includes, for example, one or more vehicles M, one or more charging facilities 200, one or more battery sales store terminals 300, a terminal device 400, and an information providing server 500. The vehicle M, the charging facility 200, the terminal device 400, and the information providing server 500 can communicate with each other via, for example, a network NW. The network NW includes, for example, a cellular network, a Wi-Fi network, Bluetooth (registered trademark), the Internet, a wide area network (WAN), a local area network (LAN), a public line, a provider device, a dedicated line, and a wireless base station. The information providing server 500 is an example of an "information providing device".

The vehicle M is, for example, a vehicle such as a two-wheeled, three-wheeled, or four-wheeled vehicle, and a driving source thereof is an internal combustion engine such as a diesel engine or a gasoline engine, an electric motor, or a combination thereof. The electric motor is operated using power generated by a generator connected to the internal combustion engine, or discharge power of a battery (a storage battery). Hereinafter, it is assumed that the vehicle M has one or more batteries mounted therein. Hereinafter, the battery may be a battery pack unit or a battery module unit. The battery may be replaced with a cell. The vehicle M transmits information on the battery mounted in the vehicle M, information on driving of the vehicle M, and the like to the information providing server 500 via the network NW, and receives information transmitted from the information providing server 500 and provides the received information to, for example, a user U on board.

The charging facility 200 is a facility for charging one or more batteries mounted in the vehicle M. For example, the charging facility 200 is provided, for example, at a parking lot of a home or a commercial facility, a battery sales store (for example, a dealer) to be described below, or another charging spot. The charging facility 200 may, for example, perform communication with the vehicle M that is being charged at the charging facility 200. In this case, the charging facility 200 may communicate with the vehicle M via a wire (for example, a signal cable to be described below) or may communicate with the vehicle M wirelessly. For example, the charging facility 200 may acquire the information on the battery mounted in the vehicle M and the information on the driving of the vehicle M, and transmit the acquired information to the information providing server 500 via the network NW.

The battery sales store terminal 300 is a terminal that is installed at a battery sales store that sells new or used (reused) batteries to the user U or updates the batteries. The battery sales store terminal 300 transmits information on a battery purchased or replaced by the user U, information on the vehicle M equipped with the battery, and the like to the information providing server 500 via the network NW.

The terminal device 400 is used by the user U who uses the vehicle M. The terminal device 400 is, for example, a smartphone or a tablet terminal. The terminal device 400 transmits operation content of the user U to the information providing server 500 via the network NW, or outputs information received from the information providing server 500 to provide the information to the user U.

The information providing server 500 centrally manages information on the user U or the vehicle. The information on the user U is, for example, personal information (for example, a user ID) of the user U, and information on the vehicle (for example, a vehicle ID or history information) owned by the user U. The information on the user U is, for example, a point imparted to the user U. The point is a point that can be used at the time of a match of anthropomorphic characters, which will be described below, which is set on the basis of one or both of the information on the battery mounted in the vehicle M and the information on the driving of the vehicle M. The point may include, for example, a point that is imparted due to purchase of goods, use of services, use of electronic settlement, and the like by the user U in the past.

A travel history of the vehicle M or information on the battery 40, for example, are included in the information on the vehicle. History information such as a purchase history or a charge and discharge history of the battery 40 mounted in the vehicle M, and information on a state of charge (SOC) of the battery 40 that is being charged at the charging facility 200, for example, are included in the information on the battery 40. The information on the vehicle may include the information on the driving of the vehicle M. The information on the driving of the vehicle M is, for example, information on eco-driving (environmentally friendly driving or green driving) of the user U. An amount of regenerative energy or an amount of generated energy of the vehicle M at a predetermined time, for example, are included in the information on eco-driving. A number of times of predetermined eco-driving may be included in the information on the driving of the vehicle M. The predetermined eco-driving is, for example, driving in which sudden acceleration or deceleration at a predetermined displacement amount or more is not performed within a predetermined time or driving in which a usage rate of an engine brake in deceleration control is equal to or higher than a threshold value.

Information on the anthropomorphic character acquired (collected) by the user U may be included in the information on the user U or the information on the vehicle M. For example, the information providing server 500 assigns the anthropomorphic character to each battery mounted in the vehicle M and manages the anthropomorphic character. The information providing server 500 may manage anthropomorphic characters (local characters and area-limited characters) associated with the charging facility 200, the battery sales store, and the like. The information providing server 500 transmits an image, sound, and play information such as a behavior of the anthropomorphic character to the vehicle M or the terminal device 400 to provide the information to the user U.

Here, the image of the anthropomorphic character (hereinafter referred to as a character image) is, for example, an image imitating a person, an animal, a plant, or a fictitious creature. Examples of the character image may include a face image at a degree at which a facial expression or a face orientation is recognized by a viewer (such as a user), and a display aspect in which a size, characteristics, or the like can be identified. Personality, attribute, and performance of the anthropomorphic character, for example, are included in the characteristics. For example, in the character image, parts imitating eyes or a mouth in a face area may be expressed, and the facial expression or face orientation may be recognized on the basis of positions of the parts in the face area. The character image may be an image that is felt three-dimensionally by a viewer and includes a head image in a three-dimensional space so that a face orientation of the character is recognized. The character image may include an image of a main body (a body or limbs) in which an operation, behavior, posture, or the like of the character are recognized. The character image may be an animation image. For example, the character image may be one of components included in an image set including a plurality of images. A plurality of character images associated with growth of the anthropomorphic character, items (for example, weapons, armor, ornaments) that can be used by the anthropomorphic character, and the like, for example, are included in the image set. A voice of the anthropomorphic character (hereinafter referred to as a character voice) is a voice for causing emitting of the anthropomorphic character to be reminded. The character voice may be one of components included in a voice set including a plurality of voices. A voice associated with each of the character images included in the image set is included in the voice set. The information providing server 500 provides information on a match between the anthropomorphic characters described above.

Next, functions of the vehicle M, the terminal device 400, and the information providing server 500 will be specifically described.

[Vehicle]

Figure 2:
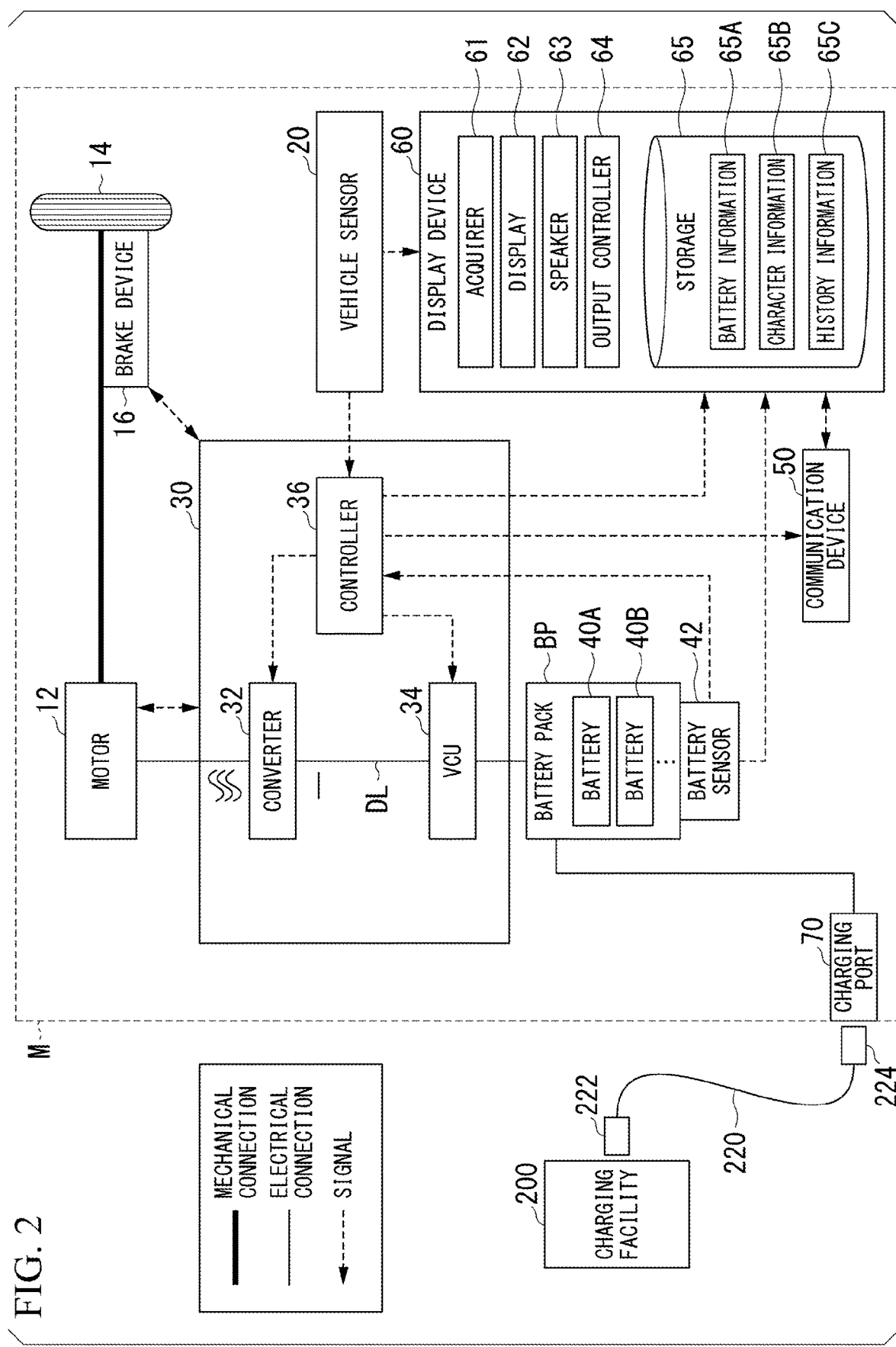
FIG. 2 is a diagram illustrating an example of a configuration of a vehicle according to the embodiment.

FIG. 2 is a diagram illustrating an example of a configuration of the vehicle M according to the embodiment. The vehicle M includes, for example, a motor 12, a drive wheel 14, a brake device 16, a vehicle sensor 20, a power control unit (PCU) 30, one or more batteries 40A, 40B, . . . , a battery sensor 42, a communication device 50, a display device 60, and a charging port 70. The one or more batteries 40A, 40B, . . . are received in a battery pack BP. Hereinafter, when the one or more batteries 40A, 40B, . . . are described without distinction, the one or more batteries 40A, 40B, . . . are simply referred to as a "battery 40".

The motor 12 is, for example, a three-phase AC motor. A rotor of the motor 12 is connected to the drive wheels 14. The motor 12 outputs power to the drive wheels 14 using supplied electric power. The motor 12 generates electricity using kinetic energy of the vehicle M at the time of deceleration of the vehicle M. Energy generated by the motor 12 may be used to charge the battery 40.

The brake device 16 includes, for example, a brake caliper, a cylinder that delivers oil pressure to the brake caliper, and an electric motor that generates the oil pressure in the cylinder. The brake device 16 may include a mechanism for delivering an oil pressure generated due to an operation of a brake pedal to the cylinder via a master cylinder as a backup. The brake device 16 is not limited to the configuration described above, and may be an electronically controlled hydraulic brake device that delivers an oil pressure of the master cylinder to the cylinder. When the brake device 16 is activated, the motor 12 generates a regenerative current. Energy generated due to this regenerative current (regenerative energy) may be used for charging of the battery 40.

The vehicle sensor 20 includes, for example, an accelerator opening sensor, a vehicle speed sensor, a brake depression amount sensor, a position sensor, and a temperature sensor. The accelerator opening sensor is attached to an accelerator pedal and detects an amount of operation of the accelerator pedal as an accelerator opening. The vehicle speed sensor includes, for example, a wheel speed sensor attached to each wheel and a speed calculator, and integrates wheel speeds detected by the wheel speed sensors to derive a speed of the vehicle (a vehicle speed). The brake depression amount sensor is attached to the brake pedal and detects an amount of operation of the brake pedal as a brake depression amount. The position sensor acquires position information of the vehicle M using, for example, a global navigation satellite system (GNSS) receiver (not illustrated). The temperature sensor detects a temperature outside the vehicle or a temperature inside the vehicle. Each piece of information acquired by each of the above-described sensors is output to a controller 36 or the display device 60.

The PCU 30 includes, for example, a converter 32, a voltage control unit (VCU) 34, and the controller 36. These components made into a single configuration as the PCU 30 is only an example, and these components may be disposed in a distributed manner.

The converter 32 is, for example, an AC-DC converter. A DC side terminal of the converter 32 is connected to a direct current link DL. The battery 40 is connected to the direct current link DL via the VCU 34. The converter 32 converts the alternating current generated by the motor 12 to direct current and outputs the direct current to the direct current link DL.

The VCU 34 is, for example, a DC-DC converter. The VCU 34 boosts a power supplied from the battery 40 and outputs the boosted power to the direct current link DL.

The controller 36 includes, for example, a motor controller, a brake controller, and a battery and VCU controller. The motor controller, the brake controller, and the battery and VCU controller may be replaced with separate control devices, such as control devices such as a motor ECU, a brake ECU, and a battery ECU.

The controller 36 controls the motor 12 using the motor controller on the basis of an output of the vehicle sensor 20. The controller 36 controls the brake device 16 using the brake controller on the basis of the output of the vehicle sensor 20. The controller 36 calculates the SOC of the battery 40 on the basis of an output of the battery sensor 42 attached to the battery 40 using the battery and VCU controller, and outputs the SOC to the VCU 34 and the display device 60. The calculation and output of the SOC may be repeatedly executed at predetermined timings. The controller 36 outputs information on a vehicle speed output by the vehicle sensor 20 to the display device 60. The VCU 34 increases a voltage of the direct current link DL in response to an instruction from the battery and VCU control. The controller 36 acquires the amount of generated energy and the amount of regenerative energy from the motor 12.

Each of the batteries 40A, 40B, . . . received in the battery pack BP is a secondary battery such as a lithium ion battery, for example. The battery 40 stores electric power for traveling of the vehicle M. For example, the battery 40 stores electric power supplied from the external charging facility 200 through the charging port 70 of the vehicle M, performs charging, and performs discharging for traveling of the vehicle M. The charging port 70 is provided toward the outside of a vehicle body of the vehicle M. The charging port 70 is connected to the charging facility 200 via a charging cable 220. The charging cable 220 includes a first plug 222 and a second plug 224. The first plug 222 is connected to the charging facility 200, and the second plug 224 is connected to the charging port 70. Electricity supplied from the charging facility 200 is supplied to the charging port 70 via the charging cable 220. The charging cable 220 includes a signal cable attached to a power cable. The signal cable mediates communication between the vehicle M and the charging facility 200. Therefore, each of the first plug 222 and the second plug 224 is provided with a power connector for connecting the power cable to a signal connector for connecting the signal cable. A connection circuit (not illustrated) may be provided between the charging port 70 and the battery 40. The connection circuit delivers a DC power supplied from the charging facility 200 to the battery 40 via the first plug 222, the charging cable 220, the second plug 224, and the charging port 70. The connection circuit may supply a DC power delivered from the battery 40 to the charging facility 200 via the charging port 70, the second plug 224, the charging cable 220, and the first plug 222. The battery 40 may store, for example, electric power for traveling of the vehicle M using the generated energy or regenerative energy described above.

The battery sensor 42 includes, for example, a current sensor, a voltage sensor, and a temperature sensor. The battery sensor 42 detects, for example, a current value, a voltage value, and a temperature of the battery 40 using the respective sensors. The battery sensor 42 may detect whether or not the vehicle M is being charged by the electric power supplied from the charging facility 200. For example, the battery sensor 42 detects that the vehicle M is being charged when the second plug 224 is connected to the charging port 70. When the vehicle M has a configuration in which the vehicle M can be charged in non-contact with the charging facility 200, the battery sensor 42 may detect that the vehicle M is being charged by the electric power supplied from the charging facility 200 on the basis of a result of communication with the charging facility 200 or a charged state of the battery 40. The battery sensor 42 may count the number of times the battery 40 is charged. The number of times of charging is, for example, the number of times the battery 40 is charged at the charging facility 200. The number of times of charging may include the number of times the battery 40 is charged by the generated energy or regenerative energy described above. The number of times of charging may be the number of times of charging for each of the batteries received in the battery pack BP. The battery sensor 42 outputs the detected information or the number of times of charging to the controller 36 or the display device 60.

The controller 36 estimates a degree of deterioration of the battery 40 on the basis of the information acquired from the battery sensor 42, and performs learning of a deteriorating state of the battery 40. For example, the controller 36 calculates a current full charge capacity (hereinafter referred to as a "current maximum capacity") of the battery 40. The controller 36 calculates a maximum capacity ratio (a deteriorating state) of the current maximum capacity to an initial maximum capacity on the basis of the current maximum capacity and the initial maximum capacity. The initial maximum capacity is a full charge capacity of the battery 40 at the time of shipment. The controller 36 performs statistical processing such as clustering processing on results of the calculation of the full charge capacity, the SOC, charging and discharging power, and the maximum capacity ratio, and the like. This allows the controller 36 to learn the deteriorating state of the battery 40. The controller 36 may derive the degree of deterioration of the battery 40 on the basis of a value obtained by dividing an integrated value ($\Delta I[Ah]$) of a charging current of the battery 40 between a first point in time and a second point in time after lapse of a predetermined time different from the first point in time by a difference ($\Delta SOC [\%]$) between a first charging rate of the battery 40 and a second charge rate of the battery 40.

The controller 36 outputs the calculation results to the display device 60. Further, the controller 36 may calculate a frequency of use of the battery 40 and output the frequency of use to the display device. The frequency of use may be, for example, a degree of operation (frequency of boarding) of the vehicle M, or may indicate a frequency of charging or a frequency of discharging of the battery 40.

The communication device 50 includes a wireless module for connection of a cellular network or a Wi-Fi network. The communication device 50 transmits information from the controller 36 and the display device 60 to the terminal device 400 or the information providing server 500 via the network NW. The communication device 50 receives the information transmitted by the terminal device 400 or the information providing server 500 and outputs the received information to the display device 60.

The display device 60 includes, for example, an acquirer 61, a display (an example of a display) 62, a speaker 63, an output controller 64, and a storage 65. The acquirer 61 and the output controller 64 are realized by, for example, a hardware processor such as a central processing unit (CPU) executing a program (software). Some or all of these components may be realized by hardware (including circuitry) such as a large scale integration (LSI), an application specific integrated circuit (ASIC), a field-programmable gate array (FPGA), or a graphics processing unit (GPU), or may be realized by software and hardware in cooperation. The program may be stored in a storage device (a non-transitory storage medium) such as a hard disk drive (HDD) or a flash memory in advance, or may be stored in a removable storage medium (non-transitory storage medium) such as a DVD or a CD-ROM and installed by the storage medium being mounted in a drive device. A display 62 and the speaker 63 are examples of an "output".

The storage 65 may be realized by the various storage devices described above, an electrically erasable programmable read only memory (EEPROM), a read only memory (ROM), a random access memory (RAM), or the like. The storage 65 stores, for example, battery information 65A, character information 65B, history information 65C, a program, and various types of other information. FIG. 3 is a diagram illustrating an example of content of the battery information 65A. In the battery information 65A, for example, a product name, a start date of use, the number of times of charging, an SOC [%], and a character ID are associated with a battery ID that is identification information for identifying a battery. The product name is, for example, information on a product name or model of the battery. The start date of use is, for example, a date when the battery 40 is mounted in the vehicle. The number of times of charging is, for example, the number of times of charging of the battery 40 detected by the battery sensor 42. The character ID is identification information for identifying the anthropomorphic character. An index value indicating deterioration of the battery may be stored in the battery information 65A. In the battery information 65A, an average number of times of charging, an average SOC, and a character ID of each battery may be associated with the battery pack BP.

FIG. 4 is a diagram illustrating an example of content of the character information 65B. In the character information 65B, character image information, character voice information, and detailed information are associated with the character ID. The character image information is information on the image of the anthropomorphic character. The character voice is information on the voice of the anthropomorphic character. The detailed information is, for example, information on a growth level or characteristics of the anthropomorphic character. The growth level is, for example, an index value that is set on the basis of an experience value obtained by the match. A greater experience value is imparted when the anthropomorphic character wants to win the match than when the anthropomorphic character loses, and a greater experience value is imparted when the growth level of the match opponent is higher. A physical strength, attack power, and defense power of the anthropomorphic character increases depending on a magnitude of the growth level. The physical strength, the attack power, and the defensive power may be stored in the detailed information.

An item ID as identification information for identifying weapons, armor, or decorations of the anthropomorphic character, and a skill ID as identification information for identifying skills that the anthropomorphic character can use at the time of a match may be included in the detailed information. The skill is, for example, a technique, a spell, magic, or the like that is used for an attack when the match is a battle. A defensive or healing skill may be included in the skill. The skill is a type of rotation, step, dance, or the like when the match is dance, and is a playable musical instrument, an intonation, a rhythm, or the like when the match is performance That is, the skill is information that can be changed depending on content of the match. The character information 65B is, for example, information acquired from the information providing server 500.

FIG. 5 is a diagram illustrating an example of content of the history information 65C. Information such as the travel history, the purchase history, the charge and discharge history, and a driving history of the vehicle M, for example, are included in the history information 65C. Each of these pieces of information is managed together with time information. Information on the accelerator opening, the vehicle speed, the amount of brake depression, a position of the vehicle, a temperature outside the vehicle, and a temperature inside the vehicle acquired from the vehicle sensor 20, for example, are included in the travel history. Information such as a route, a time, and a traveling distance to which the vehicle M has traveled, for example, may be included in the travel history. Information on a type, a date of purchase, or a date of replacement of each mounted battery 40, for example, are included in the purchase history. Information on a type, a date of purchase, or a date of replacement of a battery mounted in the vehicle M in the past may be included in the purchase history. Information on a discharge situation of the battery 40 at the time of traveling, a point at which charging is performed, information on a transition of the SOC, for example, are included in the charge and discharge history. Information on a battery temperature, current value, and voltage value acquired by the battery sensor 42, and information on the number of times of charge or a deteriorating state included in the battery information 65A are included in the charge and discharge history. The information on the driving of the vehicle M by the user U, for example, may be included in the driving history. The driving history may be generated from information on the travel history or information on the charge and discharge history.

The acquirer 61 acquires the information output from the vehicle sensor 20, the controller 36, and the battery sensor 42, and the information received by the communication device 50. Information transmitted from the information providing server 500 is included in content received by the communication device 50.

The display 62 is, for example, a liquid crystal display (LCD) or an organic electro luminescence (EL) display. The display 62, for example, is installed in a meter panel including instruments such as a vehicle speed meter provided in an instrument panel in front of a driver's seat provided with a steering wheel in a vehicle cabin. The display 62, for example, is installed near a center of the instrument panel in the vehicle cabin. The display 62 may be a display included in a human machine interface (HMI) of another in-vehicle device (for example, a navigation device). The display 62 displays information (for example, information on the anthropomorphic characters, traffic guidance, and vehicle information) that is provided to the user U who gets on the vehicle M under the control of the output controller 64.

The speaker 63 outputs, for example, a predetermined voice under the control of the output controller 64. A voice associated with the anthropomorphic character, a voice associated with traffic guidance, vehicle information, and the like, or a warning sound, for example, are included in the predetermined voice.

The output controller 64 stores the information acquired by the acquirer 61 in the storage 65. For example, the output controller 64 stores the information acquired from the vehicle sensor 20, the controller 36, and the battery sensor 42 in corresponding items of the history information 65C. The output controller 64 stores the information on the anthropomorphic character received from the information providing server 500 by the communication device 50 in the character information 65B or stores the information on the replaced battery in the battery information 65A. The output controller 64 may update the battery information 65A or the character information 65B, or delete at least a part of data stored in the history information 65C at a predetermined timing. The predetermined timing is, for example, a timing when transmission to the information providing server 500 is performed.

The output controller 64 transmits the information input from the vehicle sensor 20, the controller 36, or the battery sensor 42 or the information stored in the storage 65 to the terminal device 400 or the information providing server 500. The output controller 64 controls, for example, content or a display aspect of an image to be displayed on the display 62, and content or an output aspect of a sound to be output from the speaker 63. For example, the output controller 64 generates an image based on the information stored in the storage 65 and causes the image to be displayed on the display 62 or a predetermined sound corresponding to the image to be displayed to be output from the speaker 63. The output controller 64 may cause images or sounds regarding the information obtained from the controller 36, the vehicle sensor 20, and the battery sensor 42 to be output on the display 62 and from the speaker 63. The output controller 64 may cause information such as images or sounds received from the information providing server 500 via the network NW (for example, information indicating a match situation or a match result) to be output on each display or from the speaker 63.

[Terminal Device]

Figure 6:
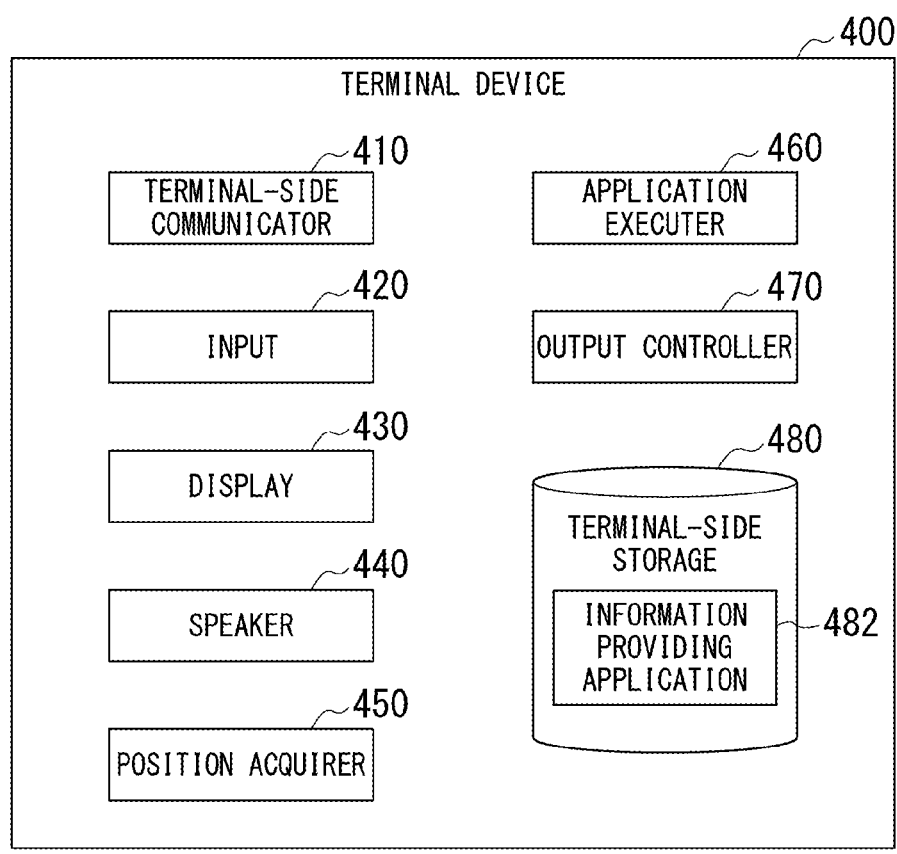
FIG. 6 is a configuration diagram of a terminal device according to the embodiment.

FIG. 6 is a configuration diagram of the terminal device 400 of the embodiment. The terminal device 400 is, for example, a terminal device that can be carried by a user, such as a smartphone or a tablet terminal. The terminal device 400 includes, for example, a terminal-side communicator 410, an input 420, a display 430, a speaker 440, a position acquirer 450, an application executer 460, an output controller 470, and a terminal-side storage 480. The position acquirer 450, the application executer 460, and the output controller 470 are realized by, for example, a hardware processor such as a CPU executing a program (software). Some or all of these components may be realized by hardware (including a circuitry) such as an LSI, an ASIC, an FPGA, or a GPU or may be realized software and hardware in cooperation. The above-described program may be stored in a storage device (a storage device including a non-transitory storage medium) such as an HDD or a flash memory of the terminal device 400 in advance, or may be stored in a detachable storage medium such as a DVD, a CD-ROM, or a memory card and installed in the storage device of the terminal device 400 by the storage medium (a non-transitory storage medium) being mounted in a drive device, a card slot, or the like.

The terminal-side storage 480 may be realized by the various storage devices, an EEPROM, a ROM, a RAM, or the like. An information providing application 482, a program, and various types of other information, for example, are stored in the terminal-side storage 480. Information corresponding to the character information 65B may be stored in the terminal-side storage 480.

The terminal-side communicator 410, for example, uses the network NW to perform communication with an external device such as the vehicle M or the information providing server 500.

The input 420, for example, receives an input of the user U according to an operation of various keys, buttons, or the like. The display 430 is, for example, an LCD or an organic EL display. The input 420 may be integrally configured with the display 430 as a touch panel. The display 430 displays various types of information in an information providing process in the embodiment under the control of the output controller 470. The speaker 440, for example, outputs a predetermined voice under the control of the output controller 470. The display 430 and the speaker 440 are examples of an "output".

The position acquirer 450 acquires position information of the terminal device 400 using a GNSS receiver (not illustrated) built in the terminal device 400, and transmits the acquired position information to the information providing server 500.

The application executer 460 is realized by the information providing application 482 stored in the terminal-side storage 480 being executed. The information providing application 482 is an application program for causing, for example, a character image associated with the anthropomorphic character associated with the vehicle M or an in-vehicle device (for example, the battery 40) to be displayed on the display 430 or causing the character voice to be output from the speaker 440. The information providing application 482 may perform communication with the information providing server 500 via the network NW, acquire the information on the anthropomorphic character associated with the user U or the like from the information providing server 500, and cause the acquired information to be displayed on the display 430 or to be output from the speaker 440. The information providing application 482 may display a screen for purchase of the anthropomorphic characters or items, and transmit a purchase request to the information providing server 500 on the basis of an instruction from the user U. The information providing application 482 may acquire information (for example, the history information of the vehicle M) other than the anthropomorphic character, and cause the acquired information to be displayed on the display 430 or a character voice to be output from the speaker 440. The information providing application 482 may receive various types of information on the match of the anthropomorphic character from the user U, transmit the information to the information providing server 500, and acquire the information on the match situation or the match result.

The output controller 470 controls content or a display aspect of an image to be displayed on the display 430 and content or an output aspect of the voice to be output from the speaker 440 under the control of the application executer 460. The output controller 470 may transmit information or the like received by the input 420 to the information providing server 500.

[Information Providing Server]

Figure 7:
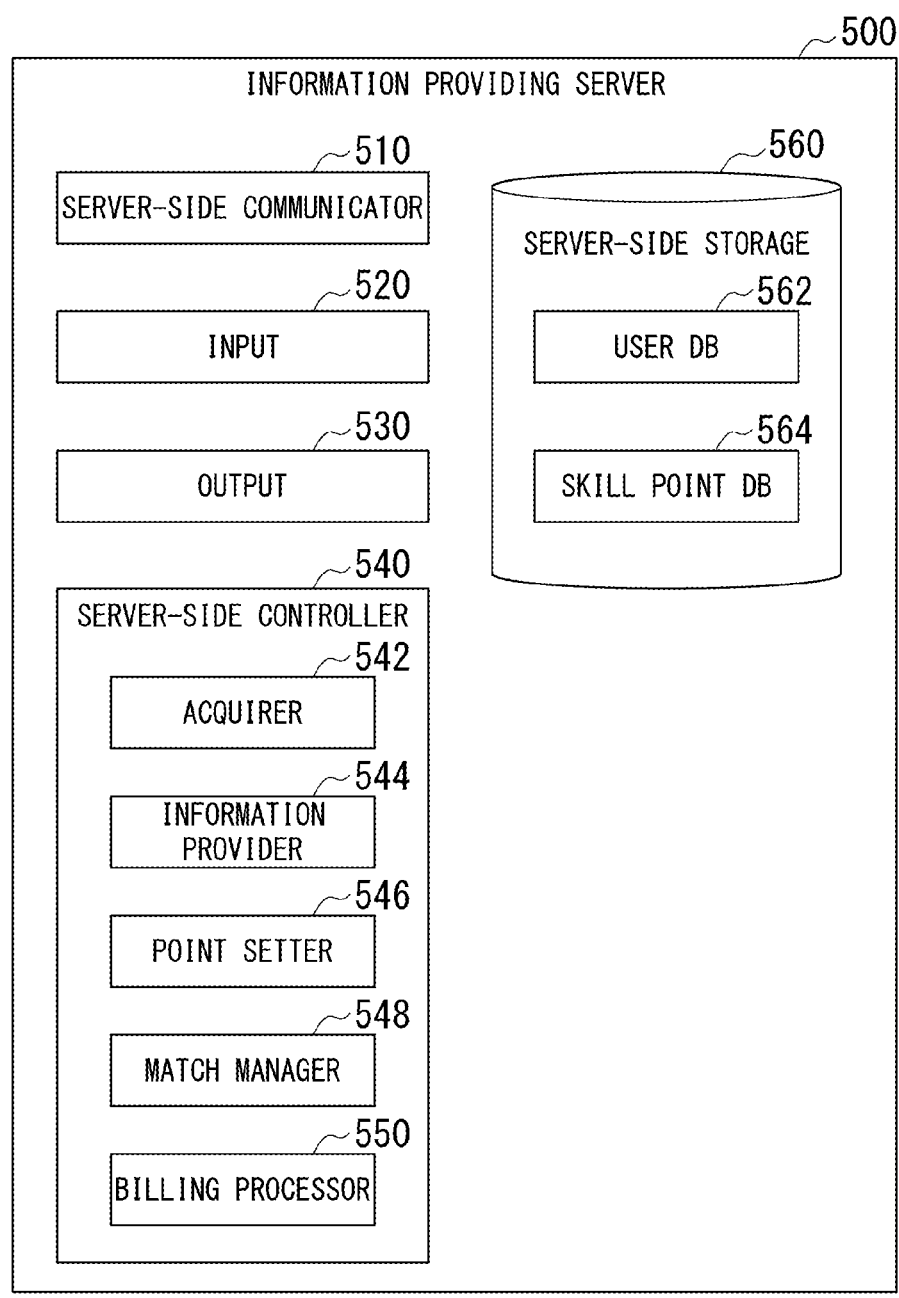
FIG. 7 is a configuration diagram of an information providing server of the embodiment.

FIG. 7 is a configuration diagram of the information providing server 500 of the embodiment. The information providing server 500 includes, for example, a server-side communicator 510, an input 520, an output 530, a server-side controller 540, and a server-side storage 560. The information providing server 500 may function as, for example, a cloud server that communicates with the vehicle M or the terminal device 400 via the network NW and transmits or receives various types of data.

The server-side communicator 510, for example, uses a cellular network, a Wi-Fi network, Bluetooth, or the like to communicate with the vehicle or another external device via the network NW. The server-side communicator 510 may include a communication interface such as a network interface card (NIC).

The input 520, for example, is a user interface such as a button, a keyboard, and a mouse. The input 520 receives an operation of a server administrator or the like. The input 520 may be a touch panel configured integrally with a display of the output 530.

The output 530 outputs information to the server administrator or the like. The output 530 includes, for example, the display that displays an image and an audio output that outputs an audio. The display includes, for example, a display device such as an LCD or an organic EL display. The display displays an image of information that is output by the server-side controller 540. The audio output is, for example, a speaker. The voice output outputs a voice of the information that is output by the server-side controller 540.

The server-side controller 540 includes, for example, an acquirer 542, an information provider 544, a point setter 546, a match manager 548, and a billing processor 550. Each component of the server-side controller 540 is realized, for example, by a processor such as a CPU executing a program stored in the server-side storage 560. Some or all of the components of the server-side controller 540 may be realized by hardware (a circuitry) such as an LSI, an ASIC, an FPGA, or a GPU or may be realized by software and hardware in cooperation. The above-described program may be stored in a storage device (a storage device including a non-transitory storage medium) such as an HDD or a flash memory of the information providing server 500 in advance, or may be stored in a detachable storage medium such as a DVD, a CD-ROM, or a memory card and installed in the storage device of the information providing server 500 by a storage medium (non-transitory storage medium) being installed in a drive device, a card slot, or the like. The point setter 546 is an example of a "setter".

The server-side storage 560 may be realized by, for example, the various storage devices, an EEPROM, a ROM, or a RAM. A user DB 562, a skill point DB 564, a program, and various types of other information, for example, are stored in the server-side storage 560.

The acquirer 542 acquires the information on the battery 40 or the history information 65C from the vehicle M. The history information 65C includes the information on the driving of the vehicle M. The acquirer 542 stores the acquired information in, for example, the user DB 562 of the server-side storage 560.

FIG. 8 is a diagram illustrating an example of content of the user DB 562. The user DB 562 is, for example, information in which a vehicle ID for identifying the vehicle M, a terminal device ID for identifying the terminal device 400 that is used by the user U, history information, a battery SOC, character information. a point that can be used at the time of a match, and benefit information are associated with a user ID for identifying the user U. The history information corresponds to the history information 65C acquired from the vehicle M. The history information stores the history information 65C in association with the acquired vehicle ID of the vehicle M and the user ID. The history information may include a history of a predetermined period of time (for example, January, three months, one year). The battery SOC is, for example, a SOC of the battery 40 acquired from the vehicle M when a match request is received. The battery SOC may be an average SOC of the respective batteries included in the battery pack BP or may be an SOC of each battery. The character information corresponds to the character information 65B acquired from the vehicle M. The point that can be used at the time of a match is a usable point that is set to cause the anthropomorphic character to perform a predetermined operation when the anthropomorphic character plays a match with another anthropomorphic character. The predetermined operation is, for example, an attack or defense when a match with the other anthropomorphic character is played. The predetermined operation may include an operation for causing the anthropomorphic character to dance or play a musical instrument, and scoring a skill for a match. The point that can be used at the time of a match is set by, for example, the point setter 546. The benefit information is, for example, a service such as special treatment or benefits or information having an economic value that is imparted to the user U when the vehicle M satisfies a predetermined condition. A service point, an electronic coupon (a gold coupon, a discount coupon, or a complimentary ticket), a giveaway, and various other preferential treatments, for example, may be included be in the benefit information. Purchase or replacement of the vehicle M or a vehicle, charging of the battery 40 at the predetermined charging facility 200, victory in a match of an anthropomorphic character to be described below, and the like, for example, are included in the predetermined conditions.

The acquirer 542 acquires a match request of the anthropomorphic character from the vehicle M. The acquirer 542 acquires distribution information indicating that at least some of the points based on one or both of the information on the battery 40 and the information on the driving of the vehicle M are distributed as a point for causing the anthropomorphic character to perform a predetermined operation.

The information provider 544 provides the user U with information on a match between the anthropomorphic character associated with the battery 40 and the other anthropomorphic character, for example. Here, "providing the user U with information" refers to, for example, transmitting the information to the vehicle M or the terminal device 400 and displaying an image or outputting a voice from an output provided in the vehicle M or the terminal device 400 to present the information to the user U. For example, the information provider 544 provides the user U with information on the other anthropomorphic character serving as a match opponent, information on the point that can be used at the time of a match, information included in the skill point DB 564, a match situation or match result, and information on the benefit information or the like under control of the match manager 548. The information provider 544 may generate an image or sound to be output to each output of the display device 60 of the vehicle M and transmit the generated information.

The point setter 546 sets points for the user of the vehicle M on the basis of one or both of the information on the battery 40 and the information on the driving of the vehicle M. The point for the user of the vehicle M correspond to, for example, the point that can be used at the time of a match. For example, the point setter 546 refers to battery SOC information of the user DB 562 on the basis of the user ID and the vehicle ID associated with the user who has made the match request to derive a point according to an SOC amount. The match manager 548 may refer to the history information of the user DB 562 to impart a point according to driving content such as the number of eco-driving in the predetermined period. The predetermined period may be, for example, a period of one week or one month or may be a period from a previous match.

For example, the point setter 546 performs setting so that the point is increased when the larger the SOC or the more times the eco-driving is performed. The point setter 546 sets one or both of the point set from the information on the battery 40 and the point set from the information on driving as the point that can be used at the time of a match, and stores the points in the user DB 562. When the point setter 546 uses both the point set from the information on the battery 40 and the point set from the information on driving, the point setter 546 may add both the points or may weight one of the points and add the weighted point to the other point. The point setter 546 may set points according to the goods or services regarding the vehicle M purchased by the user U and impart the set point to the point that can be used at the time of a match.

When the match manager 548 receives the match request using the acquirer 542, the match manager 548 generates information on the match and causes the generated information to be provided to the user U via the information provider 544. For example, when the match manager 548 receives the match request from the vehicle M of which the battery 40 is being charged at the charging facility 200 or the terminal device 400 associated with the vehicle M that is being charged, the match manager 548 determines the anthropomorphic character (an example of the other anthropomorphic character) serving as an match opponent on the basis of at least one of the SOC of the battery 40, the growth level of the anthropomorphic character, and the point that can be used at the time of a match.

For example, the match manager 548 refers to the user DB 562 to extract the anthropomorphic character of the match opponent from the character information of the other user in which a difference between a battery SOC thereof and a battery SOC of the user who has made the match request is equal to or smaller than a first predetermined value. The match manager 548 may extract the anthropomorphic character of the match opponent from the character information of the other user in which a growth level of the anthropomorphic character of the user who has made the match request is a level equal to or lower than a second predetermined value. The match manager 548 may extract the anthropomorphic character of the match opponent from the character information of the other user in which a difference from the point used at the time of the match of the user who has made the match request is a point equal to or lower than a third predetermined value. The match manager 548 may combine any of the above-described extraction methods to extract the anthropomorphic character of the match opponent. Accordingly, it is possible to select match opponents with similar levels or situations and play a close match.

When a plurality of anthropomorphic characters of match opponents are extracted, the match manager 548 may cause information on the plurality of the anthropomorphic characters extracted by the information provider 544 to be transmitted to the vehicle M or the terminal device 400 and determine a final match opponent on the basis of a result of selection by the user. It is preferable for the other anthropomorphic character serving as a match opponent to be an anthropomorphic character associated with a battery of another vehicle that is being charged at the same time, but may be, for example, a preset anthropomorphic character. When the anthropomorphic character associated with the battery of the other vehicle that is being charged at the same time is used, the match manager 548 may inquire of the user of the other vehicle about whether or not the user plays a match, and determine the user to be a match opponent when an indication that the user plays a match is received.

The match manager 548 may determine the anthropomorphic character selected by the user to be the match opponent. In this case, the match manager 548 may cause the billing processor 550 to collect a nomination fee. This allows the user to play a match with a desired match opponent.

After the match opponent is determined, the match manager 548 provides the user U with information on an anthropomorphic character of the determined match opponent and the point that can be used at the time of a match, and causes distribution of the point for causing the anthropomorphic character to be used in the match to perform a predetermined action to be executed. In this case, the match manager 548 may acquire information on a point to be consumed for each predetermined operation from the skill point DB 564 and provide the acquired information to the user U.

FIG. 9 is a diagram illustrating an example of content of the skill point DB 564. The skill point DB 564 is information in which a skill ID for identifying a skill that can be executed by the character ID, a consumption point, and a usable level are associated with the character ID. The consumption point is, for example, a point that is consumed due to execution of a skill, and the consumption point increases when the skill is more powerful. The usable level is a lowest value of the growth level at which the skill can be executed.

The match manager 548 refers to the match manager 548 using the character ID associated with the anthropomorphic character to be used by the user U to extract information on the skill ID, the consumption point, and the usable level associated with the matching character ID, and provides the information to the user U. Accordingly, the user U can more appropriately perform distribution of the point depending on the skill of the anthropomorphic character.

The match manager 548 plays a match on the basis of the distribution information acquired by the acquirer 542. For example, the match manager 548 determines victory or defeat on the basis of an order of skills (an example of the predetermined operation) set for the anthropomorphic character and the other anthropomorphic character of the match opponent and an amount of points for the skills. The match manager 548 may generate an image or sound regarding the match situation or the match result and provide the generated image or sound to the user U. The match manager 548 performs setting of the benefit information for a winner or adjustment of a penalty for a loser, a billing process, and the like on the basis of the match result, and provides a result of the adjustment to the user U.

The billing processor 550 performs a billing process regarding purchase of goods, services, or the like regarding the vehicle M by the user U. Settlement of a charge depending on a charge amount or charging time of the battery, settlement of an additional charge due to quick charging, and a process such as derivation of a purchase price of goods such as a battery and a cost related to a battery replacement service or collection of electronic money equivalent to a purchase price or cost, for example, are included in the billing process. The billing processor 550 may perform a billing process regarding purchase of a point that can be used at the time of the match or a nomination fee for the match opponent. For example, when a billing process for acquiring 100 points that can be used at the time of the match is completed, the billing processor 550 causes the point setter 546 to further add 100 points to the point that can be used at the time of the match.

[Process of Information Providing Server]

Next, details of a process of the information providing server 500 will be specifically described. Hereinafter, an information providing process between the information providing server 500 and the vehicle M will be mainly described, but the terminal device 400 may be used instead of the vehicle M. The information providing server 500 provides the user U with information on a match between the anthropomorphic character associated with the battery 40 mounted in the vehicle M and the other anthropomorphic character.

Figure 10:
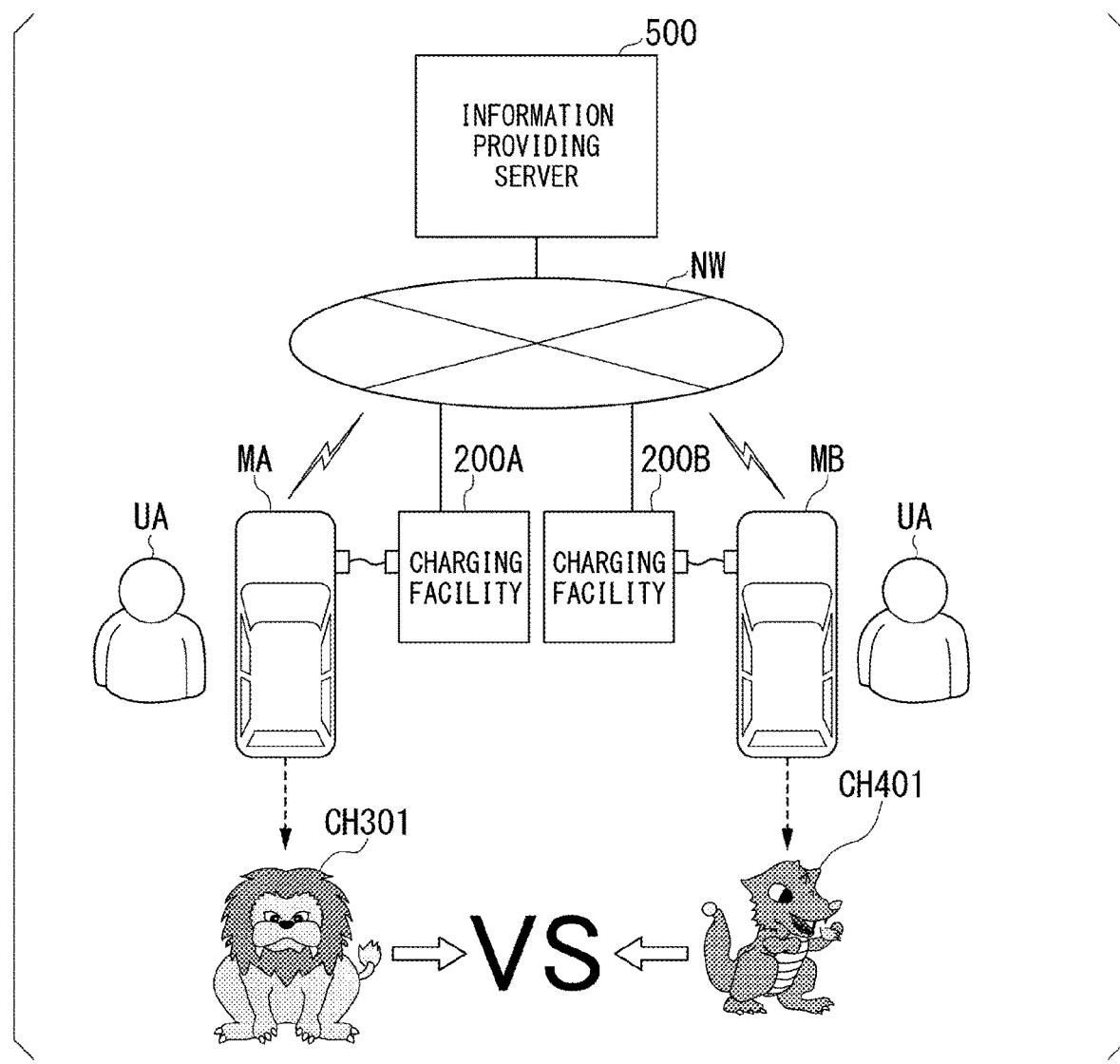
FIG. 10 is a diagram illustrating content of information provision.

FIG. 10 is a diagram illustrating content of the information provision. The information provider 544, for example, causes anthropomorphic characters associated with the batteries 40 mounted in the respective vehicles connected to the charging facility 200 to play a match in the vehicles. In the example of FIG. 10, it is assumed that two charging facilities 200A and 200B are connected to the network NW, a vehicle MA is connected to the charging facility 200A, a vehicle MB is connected to the charging facility 200B, and electric power is supplied to the battery 40 of each vehicle so that the battery 40 is charged.

The charging facilities 200A and 200B transmit information on the batteries that are being charged in the respective vehicles MA and MB that are being charged, and information on driving of the vehicles to the information providing server 500 via the network NW. Instead of the charging facilities 200A and 200B, the respective vehicles MA and MB may transmit the information on the batteries and the information on driving to the information providing server 500. The acquirer 542 of the information providing server 500 acquires the information on the battery 40 and the information on the driving of the vehicle during charging of the vehicles MA and MB from the charging facilities 200A and 200B or the vehicles MA and MB, and stores the acquired information in the user DB 562.

When the point setter 546 receives the match request of the anthropomorphic character CH301 from the user UA of the vehicle MA that is being charged, the point setter 546 sets the points that can be used at the time of a match on the basis of the information on the battery 40 and the information on the driving of the vehicle M. For example, the match manager 548 imparts 70 points when the SOC of the battery 40 is 70%. The match manager 548 imparts 10 points when the number of times of eco-driving in a week is 10. The match manager 548 sets 80 points, which is a sum of the respective points, as the points that can be used at the time of a match.

Then, the match manager 548 determines the match opponent on the basis of the SOC or growth level of the anthropomorphic character CH301, the point that can be used at the time of a match, or the nomination from the user UA. Hereinafter, in the example of FIG. 10, it is assumed that the anthropomorphic character CH401 associated with the battery of the vehicle MB is determined to be a match opponent. The information provider 544 transmits the information on the anthropomorphic character CH401 of the match opponent, the point that can be used at the time of the match, and information on a skill name and the points consumed corresponding to the anthropomorphic character CH301 extracted from the skill points DB 564 to the vehicle M so that the information is displayed on the display 62. The match manager 548 receives the settings of the distribution information including the content of the skill for each attack turn from the vehicle M.

Figure 11:
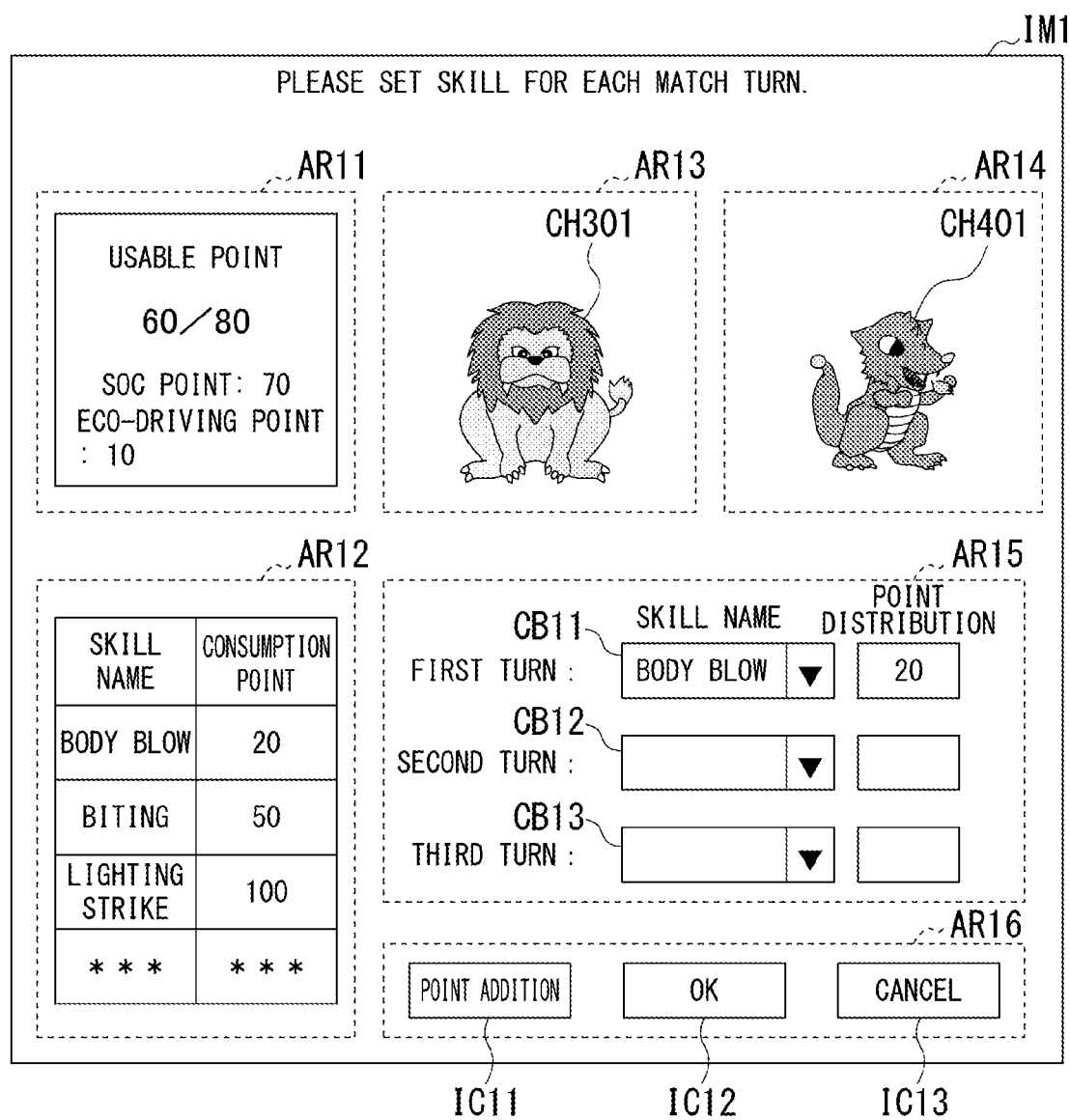
FIG. 11 is a diagram illustrating an example of an image in which a setting of skills for the anthropomorphic characters is received.

FIG. 11 is a diagram illustrating an example of an image IM1 for receiving a setting of a skill for the anthropomorphic character. A display aspect of a layout, a display content, and the like of the image IM1 is not limited to the following examples. The same shall apply in the following description of the image. A usable point display area AR11, a skill list display area AR12, a used character display area AR13, a match character display area AR14, a skill setting area AR15, and a graphical user interface (GUI) switch selection area AR16, for example, are included in the image IM1.

The information on the point that can be used at the time of a match acquired from the information providing server 500 is displayed in the usable point display area AR11. Information on a breakdown of points may be displayed in the usable point display area AR11. In the example of FIG. 11, it is shown that initially usable points are 80 points and current remaining points are 60 points (60/80), and that the breakdown of points includes that SOC points are 70 points and eco-driving points are 10 points. The information provider 544 may cause a display aspect of the points displayed in the usable point display area AR11 to be displayed using a memory, a bar, or the like instead of (or in addition to) numerical values. In this case, the information provider 544 may change the display aspect (for example, color or image) of the memory or the bar depending on the breakdowns of the points so that the respective breakdowns can be identified.

Names of skills that can be used by the anthropomorphic character CH301 that is used by the user UA and points consumed due to execution of the skills are displayed in the skill list display area AR12. Information displayed in the skill list display area AR12 is data of a portion that matches the character ID (CH301) of the anthropomorphic character used by the user UA among data stored in the skill point DB 564. The skill list display area AR12 may include information on the usable level that can be acquired from the skill point DB 564.

A character image of the anthropomorphic character CH301 to be used by the user UA, for example, is displayed in the used character display area AR13. A character image of the anthropomorphic character CH401 to be used by the match opponent, for example, is displayed in the match character display area AR14. The skill setting area AR15 is, for example, an area for inputting content (skills) to be operated by the anthropomorphic character CH301. For example, in a case in which the content of the match is that attack turns are alternate and the life of the match opponent is reduced due to an attack, a skill to be executed for each turn is set. Combo boxes CB1 to CB3 for inputting skills in first to third turns and points to be used in each of the turns are displayed in the skill setting area AR15 illustrated in FIG. 11. The combo boxes CB1 to CB3 are a combination of a rectangular area (text box) for text input and an item selection list (a list box). The user UA may input the skill name in the text box or may select one from one or more skill names displayed in the list box. When the anthropomorphic character CH301 has not reached a level at which the skill can be executed, the skill may be controlled so that the skill cannot be selected. When the skill name is set in at least one of the combo boxes CB1 to CB3, a point distribution corresponding to the skill name is displayed, and a value obtained by subtracting the consumption point from the usable point is displayed in the usable point display area AR1. The user UA sets a skill for each turn in a range in which the usable point does not become zero (0). The information provider 544 may be able to change a distribution point that is used for each skill. In this case, the information provider 544 can adjust the amount of points in a range in which the amount of points does not exceed the consumption point displayed in the skill list display area AR12. Accordingly, the strength can be adjusted depending on the amount of point even with the same skill. For example, the strength becomes higher when the number of points becomes higher.

In a GUI switch selection area AR16, various GUI buttons that can be selected by the user are displayed. In the example of FIG. 11, a point addition button IC11 for causing an image indicating information for adding the point that can be used at the time of a match to be displayed, a setting permission button (OK button) IC12 for permitting execution of a match with content set in the skill setting area AR15, and a cancel button (CANCEL button) IC13 for not permitting a setting, for example, are displayed in the GUI switch selection area AR16. When the user UA selects the point addition button IC11, the information provider 544 adds a new point to the point that can be used at the time of the match set by the point setter 546 to generate information for increasing the point that can be used at the time of a match, and provides the generated information to the user U.

Figure 12:
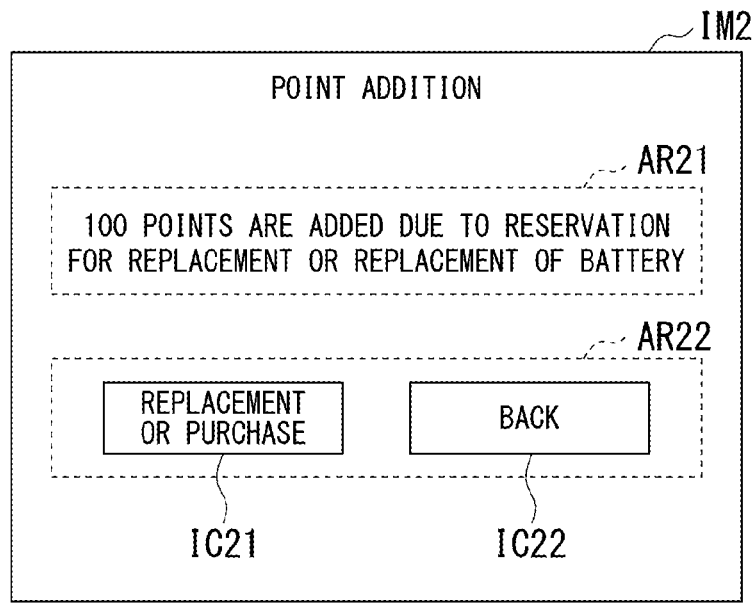
FIG. 12 is a diagram illustrating an example of an image indicating information for causing a point to be added.

FIG. 12 is a diagram illustrating an example of an image IM2 showing information for adding a point. The image IM2 includes, for example, a point addition information display area AR21 and a GUI switch selection area AR22. Information for increasing the number of points that can be used at the time of a match, for example, is displayed in the point addition information display area AR21. Information on purchasing goods or services regarding the vehicle, for example, is included in the information for increasing the point that can be used at the time of a match. In the example of FIG. 12, text information such as "100 points are added due to reservation for replacement or purchase of the battery" is displayed in the point addition information display area AR21. The goods or services regarding a vehicle may include goods (for example, car navigation devices or tires) other than batteries or services (for example, vehicle inspection service). The goods or services regarding the vehicle may include a service for rapid charging at the charging facility 200. Because the SOC of the battery 40 can be increased in a short time by performing rapid charging, the point can be eventually increased when the point is set on the basis of the SOC. A process for increasing the point that can be used at the time of a match is performed before the match, but may be performed during the match.

A replacement or purchase button IC21 for transition to a screen for reservation of replacement or purchase of a battery, and a back button IC22 for ending a display of the image IM2 and causing the image IM1 to be displayed, for example, are displayed in the GUI switch selection area AR22. When the replacement or purchase button IC21 is selected by the user UA, the information provider 544 causes a list of batteries that can be purchased, a list of battery sales stores that perform replacement, or the like to be displayed on the display 62, and receives a setting for selection of a battery or registration of a reservation date and time for the store. The information provider 544 may cause the billing processor 550 to execute a billing process for the selected battery, for example. When the purchase of the battery or the reservation of the battery sales store described above is completed, the match manager 548 adds a new point to the current point that can be used at the time of a match and causes a resultant point to be displayed in the usable point display area AR11 of the image IM1.

Figure 13:
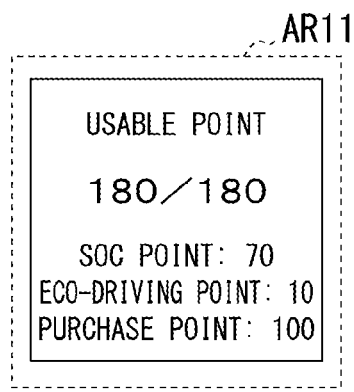
FIG. 13 is a diagram illustrating an example of display content of a usable point display area after a point at the time of purchase is added.

FIG. 13 is a diagram illustrating an example of display content of the usable point display area AR11 after a point at the time of purchase is added. After the addition of the usable points, a usable point to which the purchased point is added are sent to the usable point display area AR11, and content of a breakdown including the purchased point is displayed, as illustrated in FIG. 13. Thus, the point is added to the purchase or exchange of the battery 40, allowing the anthropomorphic character to execute a stronger skill such that the probability of winning can be increased. Further, it is possible to promote recovery of the battery by causing the battery to be replaced or purchased. When a specific battery is purchased, the match manager 548 may add a predetermined number of points or allow points to be purchased with money for a predetermined period of time after purchase of the battery. Accordingly, the use of in-stock batteries can be promoted and the battery can be used more efficiently.

Referring back to FIG. 11, when the setting permission button IC12 is selected in the GUI switch selection area AR16, the vehicle M transmits content of an order of the skills for each turn and the amount of points for the skills set in the skill setting area AR15 to the information providing server 500. When the cancel button IC13 is selected, the process ends without playing a match. The information provider 544 may provide an area allowing changing from the anthropomorphic character CH301 to another character in the image IM1. This enables the match opponent to easily perform changing from the anthropomorphic character owned by the user UA to the other character. As illustrated in FIG. 11, the information provider 544 displays a screen for causing a skill to be set for a preset number of turns, but the present invention is not limited thereto and a screen for causing a skill to be set for each turn may be provided to the user. This makes it possible to set a skill while watching the match situation. Transmission of the above-described screen to the vehicle MB of the match opponent makes it possible to acquire the order of the skills for the anthropomorphic character CH401 set by the user UB, which is the match opponent, and the amount of points for the skills.

The match manager 548 determines the victory or defeat on the basis of the order of the skills and the amount of points for the skills set for each of the anthropomorphic character CH301 and the other anthropomorphic character CH401. For example, the match manager 548 refers to the character information of the user DB 562 to extract the physical strength, attack power, defense power, and growth level of the respective anthropomorphic characters CH301 and CH401, and subtracts a value obtained by multiplying the attack power by the amount of points from a physical strength value depending on the order of each skill. In this case, the match manager 548 may adjust a magnitude or a proportion of a subtracted value depending on the defense power, the characteristics, the degree of deterioration of the battery, and the like. For example, the match manager 548 performs adjustment, for example, so that the anthropomorphic character is susceptible to an attack when the defense power is lower or the degree of deterioration of the battery is higher, or performs adjustment, for example, so that the anthropomorphic character is susceptible to an attack from a water attribute and the anthropomorphic character is less susceptible to an attack from a tree attribute when the characteristic is a fire attribute.

The match manager 548 determines a character with more physical strength to be a winner and a character with lower physical strength to be a loser after the end of the third turn. A character of which the physical strength becomes 0 first before the end of the third turn may be determined as a loser, and a character of which the physical strength is not 0 may be determined to be a winner. When the physical strengths of both are not 0 during the third turn, the match manager 548 may receive a setting of skills after a fourth turn and subsequent turns and continue the match on the basis of content of the received setting. The match manager 548 may compare the physical strengths at a point in time when a predetermined time has elapsed since the start of the match. The predetermined time is, for example, a time when the charging of the battery is completed. Accordingly, because the victory or defeat is determined after the charging of the battery is completed, it is possible to curb a state of not moving from the charging facility 200 even when the charging of the battery is completed.

Then, the match manager 548 adjusts benefits of the user on the basis of the determined victory or defeat. For example, the match manager 548 provides a service of discounting a battery charging fee of the user who wins the match. The match manager 548 may include a benefit acquired from the user who loses the match in the benefit that is imparted to the user who wins the match. In this case, the match manager 548 may collect, for example, a fee for a discounted amount of the winner from the user who is a loser. The information provider 544 may impart benefits such as raising the growth level of the character of the winning user or availability of new skills. The match manager 548 transmits information on the adjusted benefits to the vehicle M or the terminal device 400 to provide the information to the user.

Accordingly, because not only a battery can be merely charged, but also a match can be enjoyed using the anthropomorphic character corresponding to the battery, it is possible to improve the frequency of use of the charging facility 200.

<Other Match Patterns>

In the above-described match pattern, the anthropomorphic characters associated with the two vehicles MA and MB play a match, but instead, information on a team match among a plurality of the anthropomorphic characters may be provided.

Figure 14:
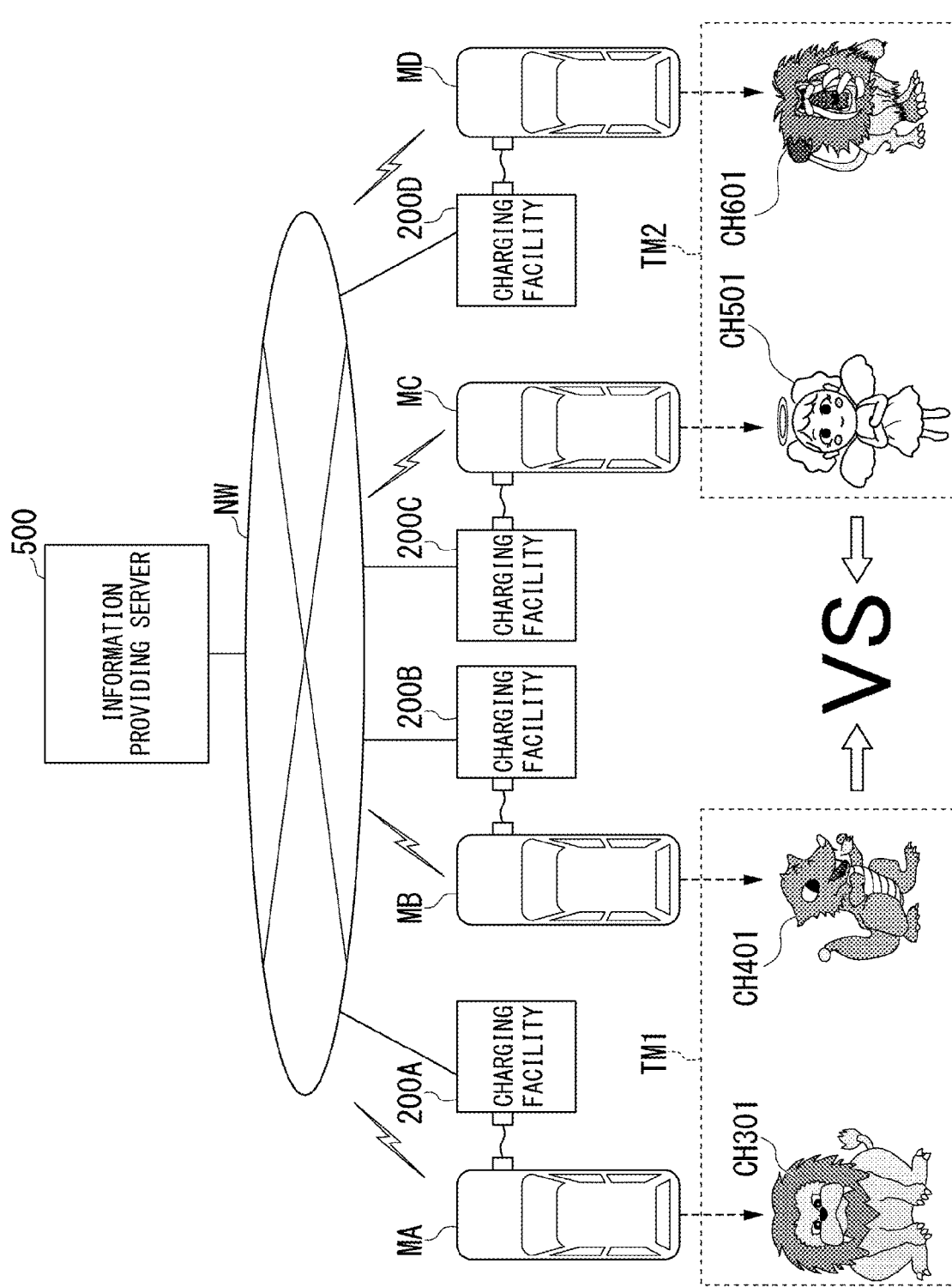
FIG. 14 is a diagram illustrating a state of a team match.

FIG. 14 is a diagram illustrating a state of the team match. In an example of FIG. 14, it is assumed that vehicles MA to MD are connected to the charging facilities 200A to 200D, respectively, and the battery 40 mounted in each of the vehicles is being charged. The charging facilities 200A to 200D or the vehicles MA to MD transmit information on the vehicles and information on the batteries that are being charged to the information providing server 500 via the network NW.

The acquirer 542 of the information providing server 500 acquires the information on the vehicles and the information on the batteries from the charging facilities 200A to 200D or the vehicles MA to MD. The match manager 548 forms teams that will play a match using the anthropomorphic characters on the basis of the information on the plurality of vehicles and batteries acquired by the acquirer 542.

For example, the match manager 548, for example, forms the teams on the basis of at least one of positions at which the charging facilities 200 are present, types of vehicles M in which the batteries 40 has been mounted, manufacturers, and types of batteries 40. For example, the charging facilities 200A and 200B are present in a first charging spot (for example, within a predetermined distance), and the charging facilities 200C and 200D are present in a second charging spot (for example, within a predetermined distance) different from the first charging spot. In this case, the match manager 548 forms team TM1 with the anthropomorphic characters CH301 and CH401 associated with the batteries that are being charged in the charging facilities 200A and 200B, and team TM2 with the anthropomorphic characters CH501 and CH601 associated with the batteries that are being charged in the charging facilities 200C and 200D, and the respective teams play a match.

The match manager 548 may form a team for each vehicle manufacturer (manufacturer), each vehicle type, each battery type, and each point that can be used at the time of a match, instead of (or in addition to) a team determination way described above.

The match manager 548 generates an image in which each anthropomorphic character plays a match between teams, and transmits the generated image to the vehicles MA and MB or the terminal devices 400 of the users of the respective vehicles. The match manager 548 may generate an animation image for performing a coalescing attack or the like depending on the type, growth level, and characteristics of the anthropomorphic character in the team. It is possible to provide the user U with plays of various battles on the basis of the anthropomorphic characters included in the team.

The match manager 548 determines the victory or defeat on the basis of the order of the skills and the amount of points for the skills for each turn set for each of the anthropomorphic characters in each team. The match manager 548 compares a plurality of growth levels, characteristics, combinations, or the like for the respective teams in an integrated manner to determine the victory or defeat of the teams. In the team match, one user may play the match using a plurality of anthropomorphic characters.

The match manager 548 may impart the experience value to a winning anthropomorphic character, impart an item depending on the experience value, or raise the growth level. The match manager 548 manages a result of the match (a match record) for each user or for each anthropomorphic character on the basis of a match history. The match manager 548 may register the match result of the anthropomorphic character as the match history in the history information of the user DB 566, for example.

The match manager 548 may generate an image including information on a ranking related to the match record (for example, a number-of-wins ranking, a winning percentage ranking, or an experience value ranking) on the basis of the match record, and may provide the generated image to the user U. Accordingly, it is possible to improve a match willingness of the user U to raise the ranking. It is possible to promote the use of the charging facility 200.

The information provider 544 may transmit information such as a match tournament to the vehicle M on a regular basis or at a predetermined timing. Accordingly, it is possible to urge the user U to move to a venue such as the charging facility 200 and, as a result, promote the use of the charging facility 200.

[Processing Flow]

Figure 15:
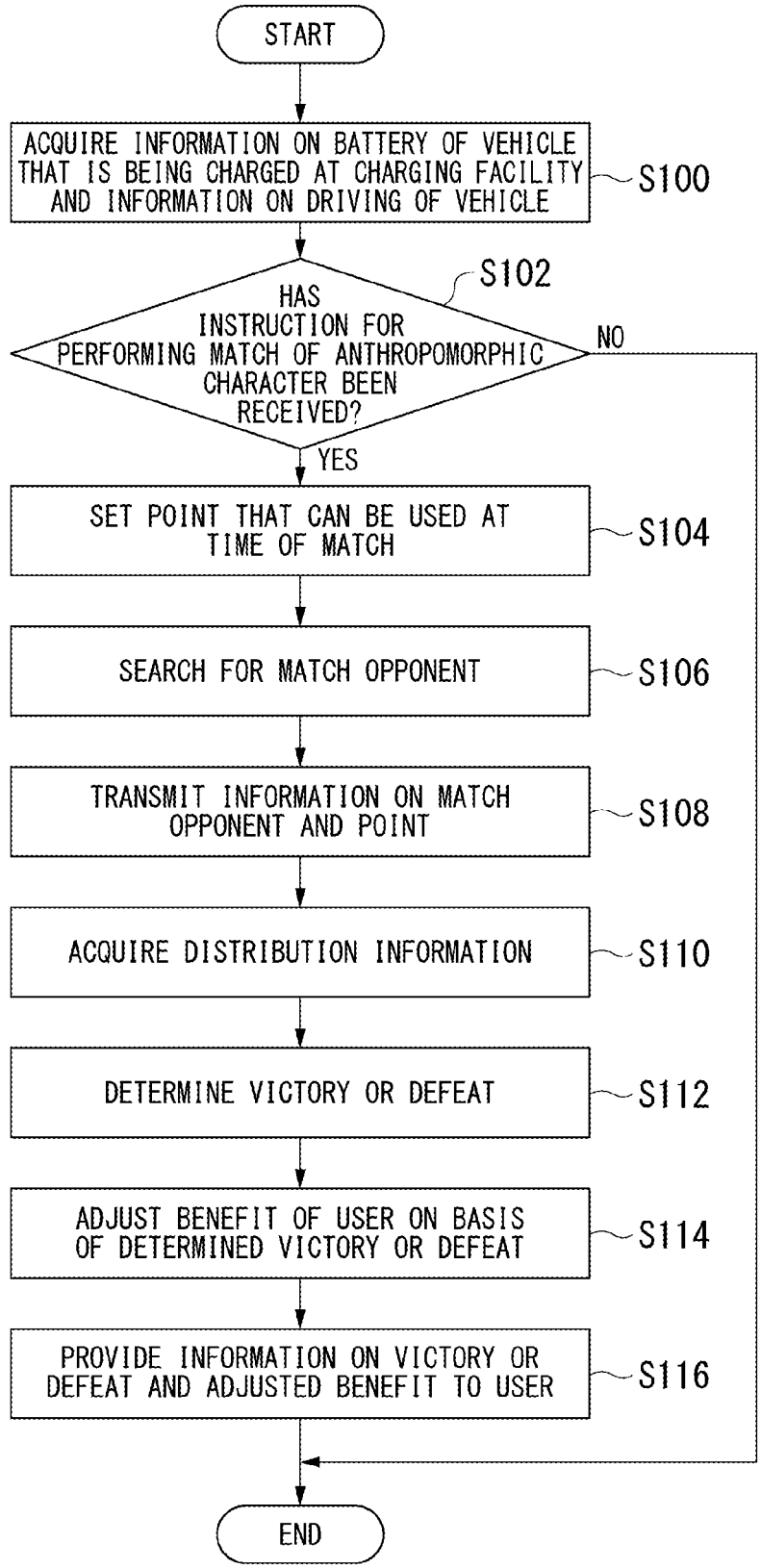
FIG. 15 is a flowchart illustrating an example of a flow of a series of processes in the information providing server.

FIG. 15 is a flowchart illustrating an example of a flow of a series of processes by the information providing server 500. The acquirer 542 acquires the information on the battery of the vehicle that is being charged at the charging facility 200 and the information on the driving of the vehicle M (step S100). Then, the acquirer 542 determines whether or not an instruction for performing the match of the anthropomorphic character has been received (step S102). When a determination is made that the instruction for performing the match of the anthropomorphic character has been received, the match manager 548 sets the point that can be used at the time of the match on the basis of the information on the battery 40 of the vehicle M and the information on the driving of the vehicle M (step S104).

Then, the match manager 548 searches for a match opponent (step S106). Then, the information provider 544 transmits information on the match opponent extracted through the search and the information on the point that can be used at the time of the match set in step S104 to the vehicle M or the terminal device 400 of the user (step S108).

Then, the acquirer 542 acquires the distribution information of the point that can be used at the time of the match set by the user so that the anthropomorphic character associated with the battery 40 executes a predetermined operation for each turn at the time of the match (step S110).

Then, the match manager 548 determines the victory or defeat on the basis of the distribution information assigned to each of the anthropomorphic character and the other anthropomorphic character of the match opponent, or the growth level or characteristics of the anthropomorphic character (step S112). In a process of step S112, the match manager 548 may generate an image of a battle scene or the like of each turn and provide the generated image to the user using the information provider 544.

Then, the match manager 548 adjusts the benefit of the user on the basis of the determined victory or defeat (step S114), and transmits information on the victory or defeat and the benefit to the vehicle M or the terminal device 400 to provide the information to the user (step S116). Accordingly, the process of this flowchart ends. When a determination is made in the process of step S102 that the instruction for performing the match is not received, the process of the flowchart ends.

Figure 16:
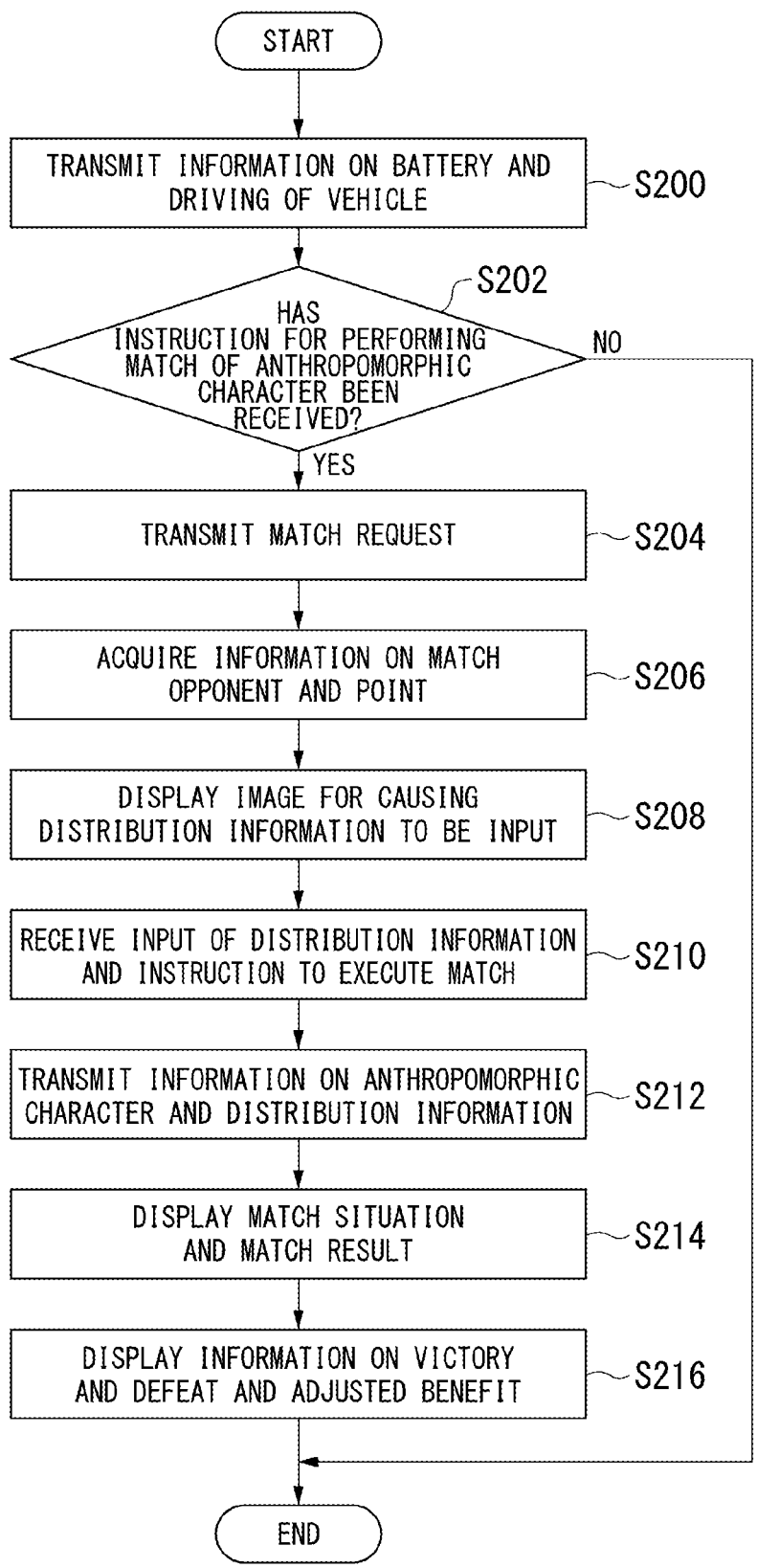
FIG. 16 is a flowchart illustrating an example of a flow of a series of processes in the vehicle.

FIG. 16 is a flowchart illustrating an example of a flow of a series of processes of the vehicle M. In the following process, an information provision process in the vehicle M will be mainly described. In the following process, a process in a state in which the battery 40 is being charged at the charging facility 200 will be described. The vehicle M transmits information on the battery and driving of the vehicle to the information providing server 500 (step S200). In a process of step S200, the information on the battery and driving of the vehicle M may be transmitted to the information providing server 500 via the charging facility 200.

Then, the acquirer 61 determines whether or not an instruction for performing a match of the anthropomorphic character has been received from the user of the vehicle M (step S202). When a determination is made that the instruction to perform the match of the anthropomorphic character has been received, the output controller 64 transmits the match request via the communication device 50 (step S204). Then, the acquirer 61 acquires the information on the anthropomorphic character of the match opponent and the point that can be used at the time of a match (step S206). Then, the output controller 64 causes an image (for example, the image IM1 illustrated in FIG. 11) for causing the user to input the distribution information to be displayed on the display 62 (step S208).

Then, when the acquirer 61 receives an input of the distribution information and the instruction to execute the match (step S210), the acquirer 61 transmits the information on the anthropomorphic character and the distribution information to the information providing server 500 (step S212). Then, the output controller 64 causes the match situation and the match result received from the information providing server 500 to be displayed on the display 62 (step S214). Then, the output controller 64 causes the information on the victory or defeat and the benefit acquired from the information providing server 500 to be displayed on the display 62 (step S216). Accordingly, the process of this flowchart ends. When a determination is made in the process of step S202 that the instruction for performing the match is not received, the process of this flowchart ends. The process illustrated in FIG. 16 may be executed by the terminal device 400. In this case, the process of step S200 is executed by the vehicle M or the charging facility 200, and the processes of steps S202 to S216 are executed by the information providing application 482.

As described above, according to the present embodiment, it is possible to provide information for promoting use or recovery of a battery mounted in a vehicle. According to the embodiment, it is possible to prompt the use of the charging facility 200 by providing an additional service that is a match of the anthropomorphic character during charging. In the above-described embodiment, the information providing server 500 may include some of functions of the vehicle M or the terminal device 400, and the vehicle M or the terminal device 400 may include some of functions of the information providing server 500.

The embodiment described above can be expressed as follows.

An information providing device including:
a storage device that stores a program, and
a hardware processor,
wherein the information providing device is configured to
set points for a user of a vehicle on the basis of one or both of information on a battery storing an electric power for traveling of the vehicle and information on driving of the vehicle,
provide information on the set point to the user of the vehicle,
acquire distribution information in which at least some of the points are distributed as a point for causing an anthropomorphic character associated with the battery to perform a predetermined operation,
generate information on a match between the anthropomorphic character and another anthropomorphic character on the basis of the acquired distribution information, and
provide the generated information to the user, by the hardware processor executing the program stored in the storage device.

Although the embodiments for carrying out the present invention have been described above using the embodiments, the present invention is not limited to these embodiments, and various modifications and substitutions can be made without departing from the gist of the present invention.

What is claimed is:

1. An information providing device comprising:
a processor configured to:
set points for a user of a vehicle on a basis of one or both of information on a battery storing an electric power for traveling of the vehicle and information on driving of the vehicle;
provide information on the points to the user of the vehicle;
acquire distribution information in which at least some of the points are distributed as points for causing an anthropomorphic character associated with the battery to perform a predetermined operation, wherein the anthropomorphic character is rendered to a display device based on the predetermined operation; and
generate information on a match between the anthropomorphic character and another anthropomorphic character on a basis of the distribution information and display, via the display device, the generated information to the user.

2. The information providing device according to claim 1, wherein the processor is further configured to set points that can be used by the user of the vehicle at the time of the match on a basis of one or both of a charge rate of the battery included in the information on the battery and an amount of regenerative energy or an amount of generated energy of the vehicle at a predetermined time included in the information on the driving of the vehicle.

3. The information providing device according to claim 1, wherein the processor is further configured to determine the other anthropomorphic character on a basis of at least one of a charge rate of the battery, a growth level of the anthropomorphic character, and a point for causing the anthropomorphic character to perform a predetermined operation.

4. The information providing device according to claim 1, wherein the processor is further configured to provide the user with information for increasing the points.

5. The information providing device according to claim 1, wherein the processor is further configured to increase the points depending on goods or services regarding the vehicle purchased by the user of the vehicle.

6. The information providing device according to claim 1, wherein the processor is further configured to determine victory or defeat on a basis of an order of predetermined operations set for the anthropomorphic character and the other anthropomorphic character and an amount of point for the predetermined operation.

7. The information providing device according to claim 1, wherein the processor is further configured to impart a benefit to the user who wins the match.

8. The information providing device according to claim 7, wherein the benefit imparted to the user who wins the match includes a benefit acquired from a user who loses the match.

9. An information providing method comprising:
- setting, by a computer, points for a user of a vehicle on a basis of one or both of information on a battery storing an electric power for traveling of the vehicle and information on driving of the vehicle;
- providing, by the computer, information on the set point to the user of the vehicle;
- acquiring, by the computer, distribution information in which at least some of the points are distributed as a point for causing an anthropomorphic character associated with the battery to perform a predetermined operation, wherein the anthropomorphic character is rendered to a display device based on the predetermined operation;
- generating, by the computer, information on a match between the anthropomorphic character and another anthropomorphic character on a basis of the acquired distribution information; and
- displaying, by the computer, the generated information, via the display device to the user.

10. A computer-readable non-temporary storage medium storing a program, the program causing a computer to:
- set points for a user of a vehicle on a basis of one or both of information on a battery storing an electric power for traveling of the vehicle and information on driving of the vehicle;
- provide information on the set point to the user of the vehicle;
- acquire distribution information in which at least some of the points are distributed as a point for causing an anthropomorphic character associated with the battery to perform a predetermined operation, wherein the anthropomorphic character is rendered to a display device based on the predetermined operation;
- generate information on a match between the anthropomorphic character and another anthropomorphic character on a basis of the acquired distribution information; and
- display the generated information to the user via the display device.

* * * * *